Feb. 1, 1955 T. E. WOODRUFF 2,701,328
ANTIHUNT MEANS FOR ELECTRIC MOTOR FOLLOW-UP SYSTEMS
Filed July 29, 1949 5 Sheets-Sheet 1

*INVENTOR.*
THOMAS E. WOODRUFF
BY
*Frank J. Epstein*
Agent

Feb. 1, 1955   T. E. WOODRUFF   2,701,328
ANTIHUNT MEANS FOR ELECTRIC MOTOR FOLLOW-UP SYSTEMS
Filed July 29, 1949   5 Sheets-Sheet 2

*INVENTOR.*
THOMAS E. WOODRUFF
BY
Frank J. Epstein
*Agent*

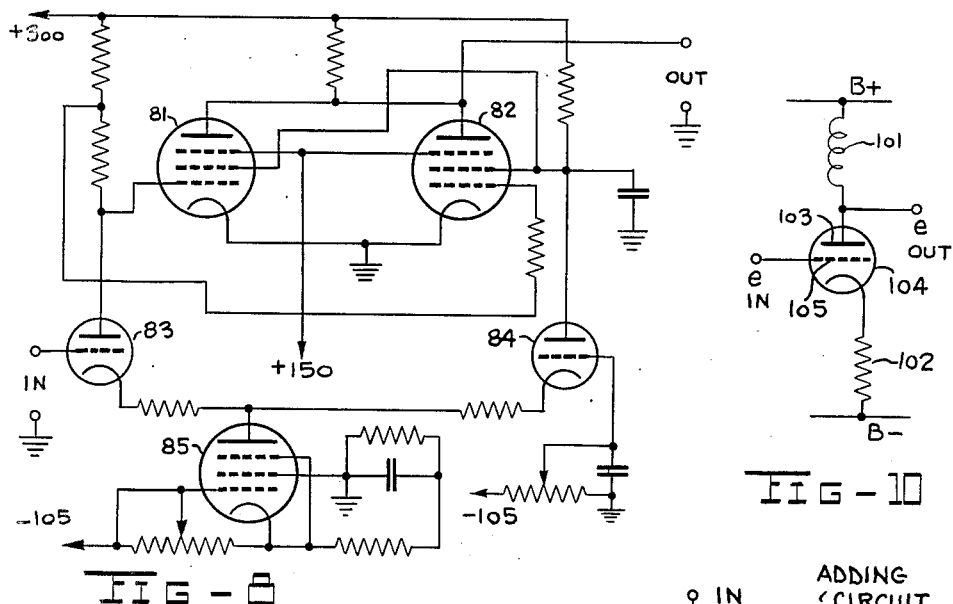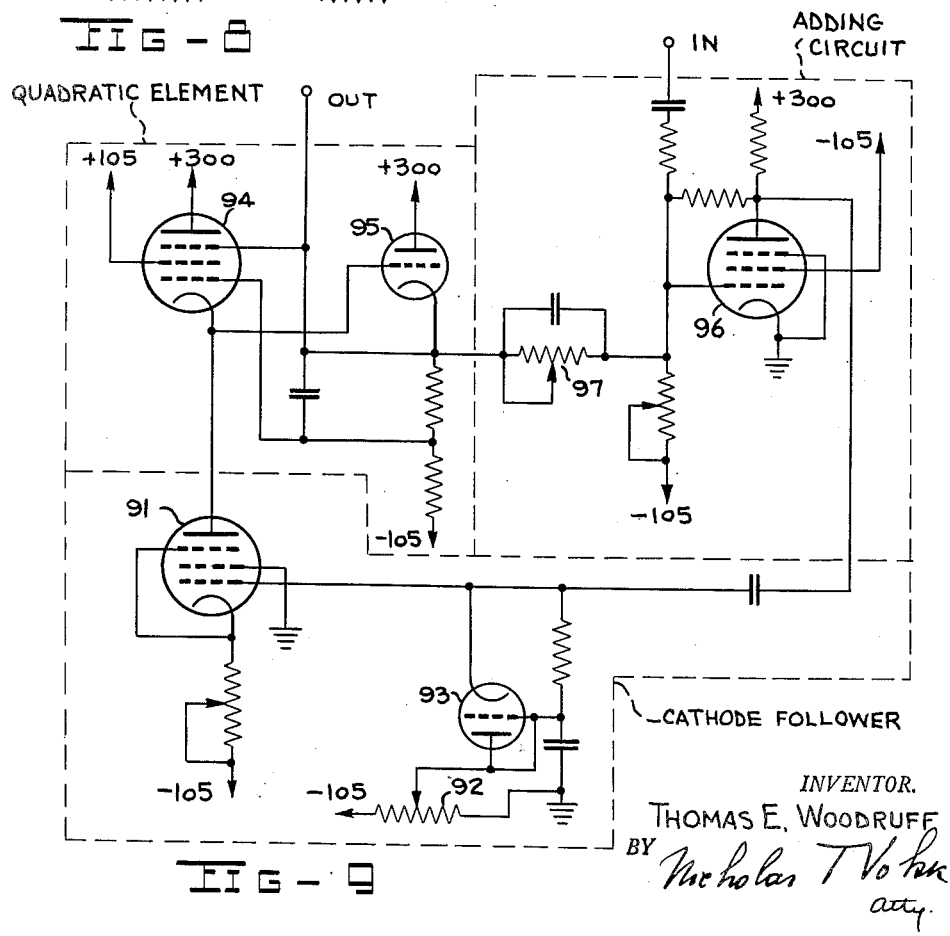

United States Patent Office 2,701,328
Patented Feb. 1, 1955

2,701,328

ANTIHUNT MEANS FOR ELECTRIC MOTOR FOLLOW-UP SYSTEMS

Thomas E. Woodruff, Redondo Beach, Calif., assignor, by mesne assignments, to Hughes Aircraft Company, a corporation of Delaware Application July 29, 1949, Serial No. 107,558

3 Claims. (Cl. 318—18)

This invention relates to automatic control systems and more particularly to electrical servo systems having improved control circuitry.

Stated in somewhat general terms, an electrical servo system comprises: means for obtaining an error signal corresponding to the displacement of a load device from a normal or desired position; a reversible servomotor mechanically coupled to the load device to correct its displacement; means for deriving control signals from the error signal; and means for controlling the energization of the servomotor in accordance with the control signals to move the load device toward the desired position. The servo loop or closed-cycle control system thus formed drives the load device toward the desired position whenever a displacement develops, and tends to maintain the error or displacement at or near zero value.

While the many servo systems thus far developed are adequate for most purposes, certain precise equipments utilizing servo systems demand an accuracy and speed of response not attainable with conventional servo systems. In proportional control systems, for example, the energization of the servomotor is increased with the load displacement, the torque and speed developed by the servomotor are correspondingly dependent upon this displacement, and the response speed or time taken to overcome the load displacement is correspondingly much greater than is ideally necessary.

It is accordingly the principal object of the present invention to provide an electrical servo system having improved performance characteristics.

Another object of the invention is to provide a servo system in which displacements are overcome by utilizing to full capacity the acceleration and deceleration capabilities of the system's servomotor.

These and other objects and advantages of the present invention will become apparent from consideration of the following description, taken with reference to the accompanying drawings in which:

Figs. 8 to 10 are circuit diagrams illustrating various components in the system of the present invention.

While the principles involved in the present invention may be applied to the design of many forms of automatic control systems, the embodiments here described by way of example contemplate servo systems which include a system load subject to angular displacement and a servomotor yielding rotational drive for correction of the displacement. In describing these embodiments, load displacements and certain factors associated therewith are referred to as either positive or negative in accordance with the sense or direction in which they occur or act. Thus, assuming a torque acting in a given direction to be positive, the rotations, velocities, and accelerations are positive when acting or taking place in that direction and negative when in the opposite direction. Similarly, displacements are termed positive or negative when they are in the direction of positive or negative rotation, respectively, as measured from some normal position. It is also to be understood that the terms "acceleration" and "deceleration" as here used signify actions, respectively, in which the velocity (time-rate of displacement) increases or decreases in magnitude. The symbols designating various signals later referred to also designate the angular displacements and time-functions thereof to which the signals correspond. It is to be further understood that while suitable amplification and proportionality factors are of course necessary in actual design of the equipment, they are here omitted as a simplification.

The basic principle of the present invention is the utilization of full servomotor drive at all times during all portions of a displacement-correction cycle, that is, both in accelerating and decelerating the load toward the end conditions of essentially zero velocity and zero displacement. For example, assuming an instance in which the system load experiences a displacement and is at rest at the moment that corrective action is initiated, an ideal cycle would involve first accelerating the system load toward zero displacement at full capability of the servomotor and then, at a suitable instant before reaching zero displacement, braking or decelerating the system load at maximum capability of the servomotor to simultaneous zero displacement and zero velocity. This ideal cycle achieves the fastest possible correction of system load displacement, and the practical embodiments to be described closely approach such action.

Figure 1:
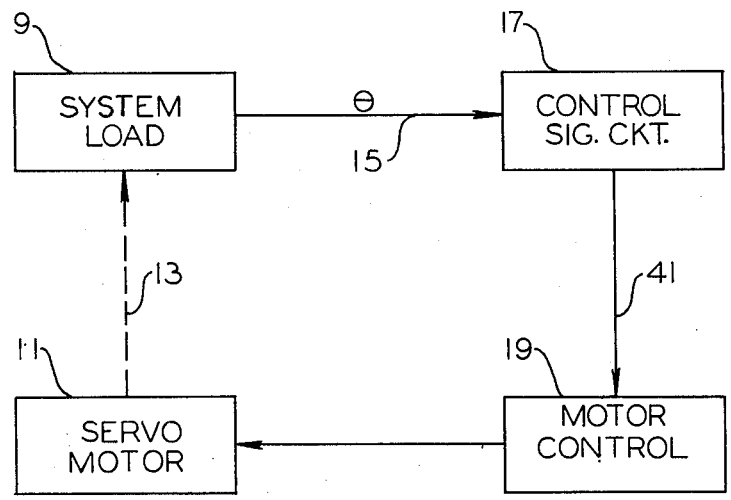
Figure 1 is a block diagram of an electrical servo system embodying the present invention.

Referring first to the general organization of the novel servo system as illustrated in block diagram form in Figure 1, the system load there shown at 9 may be positioned by a reversible servomotor 11 through gearing schematically represented by link 13. System load 9 includes means for developing an error or displacement signal Θ at lead 15, the error signal having a characteristic which varies in accordance with the instantaneous angular displacement Θ of system load 9 from a desired position. System load 9 may, for example, be an electro-optical apparatus including a sighting structure and means for providing an error signal Θ corresponding to the deviation between the sighting structure's pointing direction and the true line of sight to a bright body in the field of view. Error signal Θ is applied to a derivation or control-signal circuit 17 which, in the specific embodiments to be described, develops signals having instantaneous values proportional to a first term involving the displacement Θ and to a second term involving displacement rate or velocity $\dot{\Theta}$, and summates the two signals to provide a control signal which at any instant is either positive, negative, or zero, depending upon the sense and relative magnitudes of the two terms. The control signal output of derivation circuit 17 is applied to a motor control unit 19, adapted to energize servomotor 11 at full operating voltage at all times and, further, to control the direction of motor torque in accordance with the polarity of the control signal, effecting return of the load device toward zero displacement in a manner detailed hereinafter.

In a first embodiment of the novel servo system above outlined, derivation circuit 17 is arranged to provide a control signal corresponding to the summation of a velocity term $|\dot{\Theta}|\dot{\Theta}$ and a displacement term $2|\ddot{\Theta}|\Theta$. In these expressions, $\dot{\Theta}$ represents the variable velocity, which is either positive or negative depending upon the direction of rotation, $|\dot{\Theta}|$ represents the magnitude of the variable velocity, Θ represents the displacement, which is either positive or negative, and $|\ddot{\Theta}|$ represents a constant, the substantially fixed magnitude of acceleration or deceleration caused by application of full voltage to servomotor 11. The term $|\dot{\Theta}|\dot{\Theta}$ is thus equal to $\dot{\Theta}^2$ with sign corresponding to the sense or direction of the velocity, and the term $2|\ddot{\Theta}|\Theta$ similarly takes on the sign corresponding to the sense or direction of the displacement.

Figure 2:
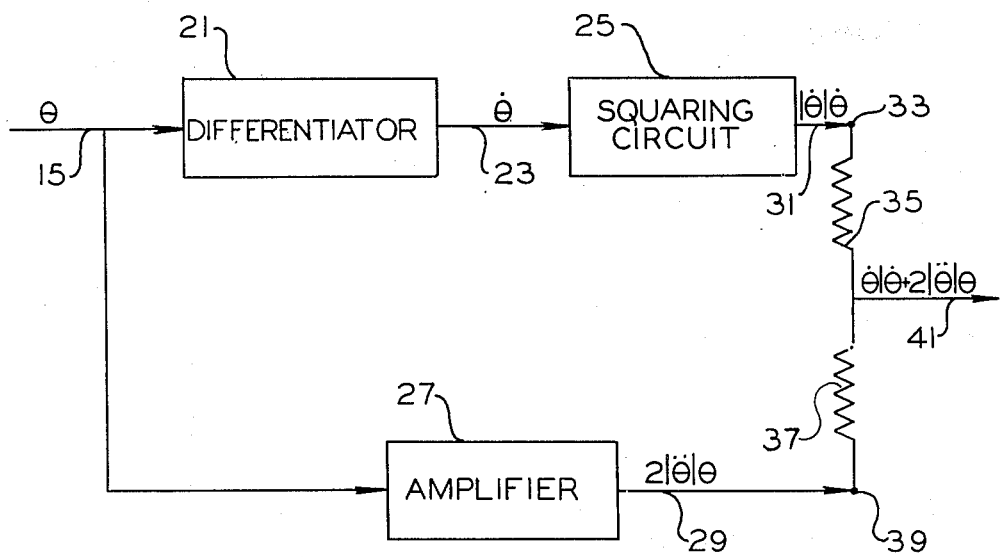
Figure 2 is a schematic diagram of a control signal circuit applicable to the system of Figure 1.

Derivation or control signal circuit 17 may here be given the form shown by the schematic block diagram in Figure 2, in which conventional components are utilized to obtain and sum signals proportional to the said velocity and displacement terms. In this derivation circuit, error signal $\Theta$ is applied over lead 15 to a differentiator 21, which provides at lead 23 a velocity signal $\dot\Theta$ proportional to the first time-derivative or time-rate of change of displacement $\Theta$. A squaring circuit 25, to which velocity signal $\dot\Theta$ is applied, develops an output signal $|\dot\Theta|\dot\Theta$, so expressed to indicate that its polarity is dependent upon the sense of velocity signal $\dot\Theta$ rather than continuously positive as in true mathematical squaring. Signal $\Theta$ is also applied to an amplifier 27 which provides at lead 29 an output signal proportional to $2|\ddot\Theta|\Theta$. The factor $\ddot\Theta$ is here set in as a fixed multiplier, this factor being substantially constant in magnitude over the normal operating range of servomotor 11. The polarity of the signal $2|\ddot\Theta|\Theta$ is thus dependent upon the sense or direction of displacement $\Theta$. Signal $|\dot\Theta|\dot\Theta$ is applied over lead 31 to an input terminal 33 of a summation circuit comprising serially connected resistors 35 and 37, and signal $2|\ddot\Theta|\Theta$ is applied over lead 29 to the other input terminal 39 of the summation circuit. The resultant control signal developed by the derivation circuit is in this instance proportional to the sum of velocity term $|\dot\Theta|\dot\Theta$ and displacement term $2|\ddot\Theta|\Theta$, and is applied over lead 41 to the motor control unit 19 shown in Figure 1.

Figure 3:
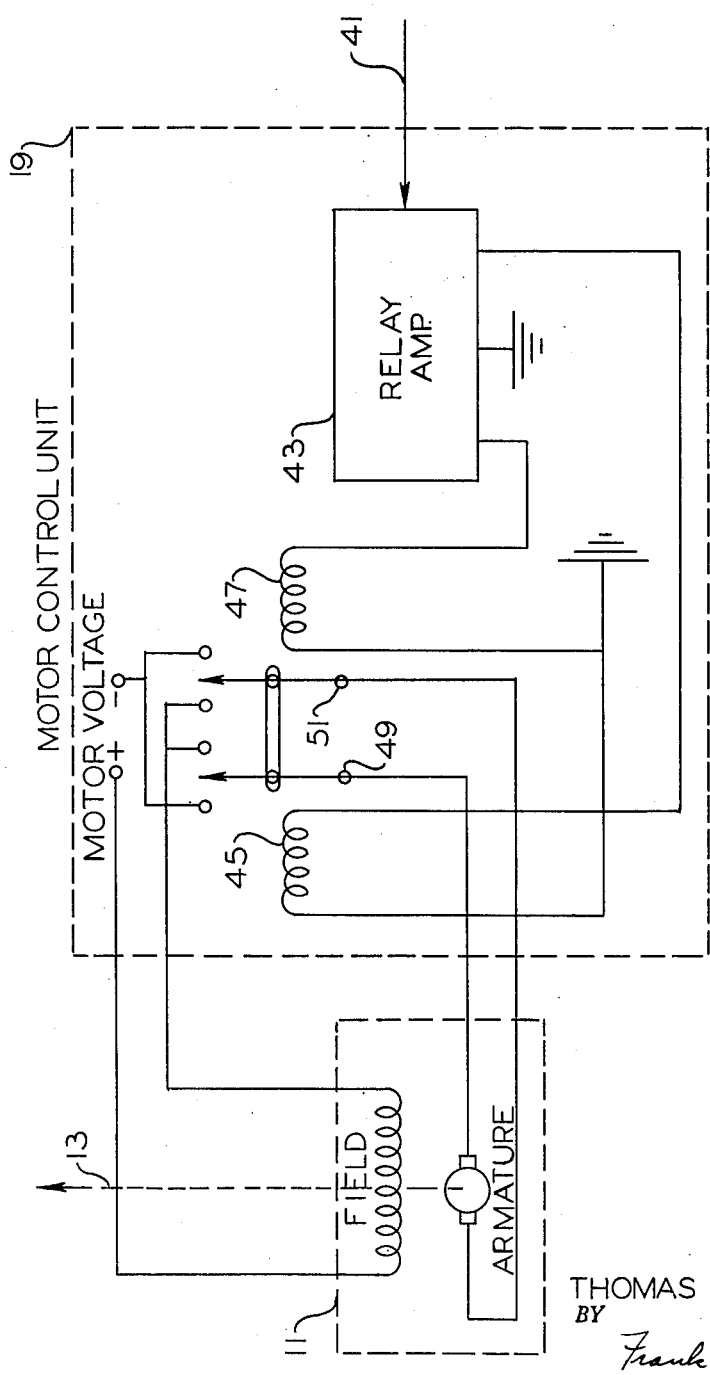
Figure 3 is a circuit diagram of a motor control unit associated with the servomotor of the system.

Motor control unit 19 may be designed to utilize fast acting relay switches in a circuit which functions to apply full operating voltage to servomotor 11, and further functions to cause the servomotor torque to be developed in a positive or forward direction for negative control-signals, and in a negative or reverse direction for positive control-signals. Servomotor 11 may be a D.-C. motor, for example, and motor control unit 19 may be arranged to reverse its armature or field connections substantially at the instants of reversal of control signal polarity. A suitable circuit which functions in such manner is indicated in Figure 3, in which relay amplifier 43, to which the control signals are applied over lead 41, energizes relay coils 45, 47 to control the position of linked switch arms 49, 51 in accordance with the control signal polarity. The means and circuitry here involved are self-explanatory, and a number of other arrangements may be utilized to provide equivalent operation.

The operation of the servo system embodiment detailed above is conveniently explained with reference to the graph shown in Figure 4, in which load displacement rate or velocity is plotted against system load displacement. Curves 53 and 55 in this graph define the angular displacement and velocity conditions for which the control signal is zero, as expressed by the equation $$|\dot\Theta|\dot\Theta + 2|\ddot\Theta|\Theta = 0$$

Points in the area lying above zero-signal curves 53 and 55 therefore represent the conditions of angular displacement and velocity for which the control signal is positive, and similarly, the conditions resulting in a control signal of negative polarity are represented by points lying below the said curves. The further significance of curves 53 and 55 lies in the fact that they delineate the precise conditions of displacement $\Theta$ and the displacement rate $\dot\Theta$ at which application of deceleration of magnitude $|\ddot\Theta|$ would carry the system load to zero velocity at zero displacement.

Figure 4:
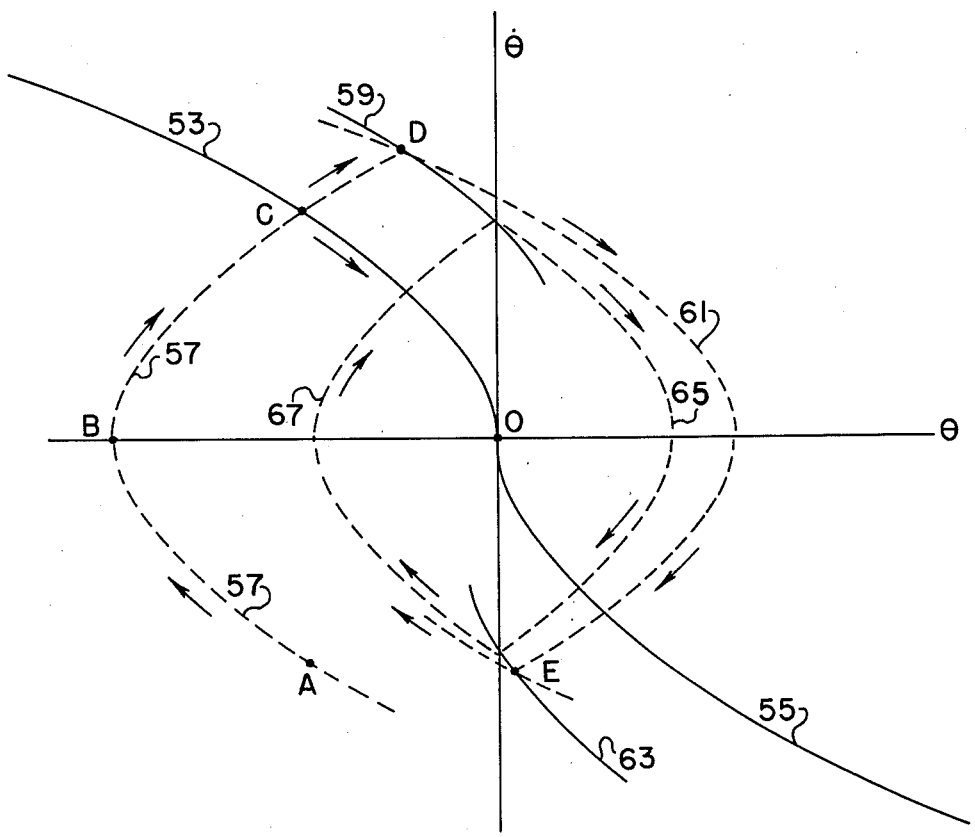
Figure 4 is a graph illustrating system load movements effected by the Figure 2 control signal circuit.

Assuming now, for an example of the system operation, an initial load condition in which there is a negative displacement accompanied by a negative velocity as at the point A in the Figure 4 graph, the corresponding instantaneous value of the control signal produced by the Figure 2 derivation circuit is negative. Servomotor 11 is accordingly energized at full applied voltage to exert its torque in a forward or positive direction, decelerating the system load until zero velocity is reached, as indicated by tracing the lower portion of positive-acceleration curve 57 in a clockwise direction to the point B. Still under the influence of forwardly directed torque, the system load then accelerates toward zero displacement, the displacement and velocity conditions following along curve 57 and at some instant reaching values which satisfy the zero control-signal curve 53, as indicated by the intersection point C. Assuming the control signal to become positive and the driving torque to become negative at the very instant that the system load reaches the displacement and velocity conditions of point C, the forward or positive velocity would then decrease under deceleration $|\ddot\Theta|$, the displacement and velocity following along curve 53 in the indicated clockwise direction until zero velocity at zero displacement would be reached at the point 0. In actual practice, the decelerating torque does not come into play at the very instant when the system load conditions reach the zero control-signal curve, but rather at a later instant, as at the intersection point D of the acceleration curve 57 and a control curve 59. This delay is due to inherent time-lags in the system components such as the delay in the opening of the relays. The ensuing conditions of the system load follow along a negative-acceleration curve 61 in the indicated clockwise direction, again past the zero control-signal curve 55 to an intersection point E lying on a control curve 63. The continuing action causes the system load to quickly reach a final condition in which it oscillates about the point of zero displacement, as indicated by the closed loop consisting of curves 65 and 67.

While the oscillation or vibration produced at the load by the described servo system might appear to be large because of the seemingly wide loops formed by curves 65 and 67 in Figure 4, the vibration is actually fast and small in amplitude, for Figure 4 represents to an enlarged scale the conditions taking place in the immediate vicinity of zero velocity and zero displacement. In a typical instance, for example, in which the system includes a 28 volt 1/12 horsepower servomotor having an acceleration characteristic of 5000 radians per second per second as measured at the motor shaft, and the servomotor is coupled to the system load through 360 to 1 reduction gearing, the total or effective time-lag in the system is substantially 4 milliseconds. The frequency of the resultant stable oscillation is in this instance approximately 50 cycles per second, and its amplitude as measured at the system load is of the relatively small order of one minute of angle.

The configurations of the several curves followed by the system load as above described are plotted from the appropriate equations of angular motion. For example, curve 57 of the Figure 4 graph represents the particular positive-acceleration curve upon which the assumed initial point A falls, and is defined by the equation $$\dot\Theta^2 - \dot\Theta_A^2 = 2\ddot\Theta(\Theta - \Theta_A)$$

where $\ddot\Theta$ is a fixed positive acceleration, $\Theta_A$ and $\dot\Theta_A$ are, respectively, the system load displacement and velocity represented by the point A, $\Theta$ is the displacement at any point along the curve, and $\dot\Theta$ is the corresponding velocity at that point. In terms of the displacement $\Theta_B$ of point B at which the velocity becomes zero upon this curve, the equation is correspondingly $$\dot\Theta^2 = 2\ddot\Theta(\Theta - \Theta_B)$$

and there is a family of such positive-acceleration curves, each having exactly the same configuration but displaced along coordinate axis $\Theta$. Since the specified acceleration is positive, these curves must, of course, be followed in a clockwise or increasing positive velocity direction to trace successive load conditions.

Similarly, the equation of the negative-acceleration curve 61 upon which point D falls is defined by the formula $$\dot\Theta^2 - \dot\Theta_D^2 = 2\ddot\Theta(\Theta - \Theta_D)$$

where $\ddot\Theta$ has a negative value. Here too there is a family of such curves in which the appropriate curve must again be traced clockwise, in an increasing negative velocity direction, to trace successive conditions.

The positions and configurations of control curves 59 and 63 which are utilized to graphically find the points at which reversals of driving torque take place, may be determined by use of the formula $$\Delta\dot\Theta = T\ddot\Theta$$

in which T is the effective delay time characteristic of the servo system, $\ddot\Theta$ is the acceleration or deceleration, and $\Delta\dot\Theta$ is the resultant change in velocity taking place between the instant at which the control-signal becomes zero and the instant at which torque reversal actually takes place. Referring to positive-acceleration curve 57, for example, the difference in velocities represented by points C and D thereon is equal to the product of the acceleration $\ddot{\theta}$ and delay time T. Since the acceleration and delay time have fixed values, the velocity change is of constant magnitude, in going between zero control-signal curve 53 or 55 and control curve 59 or 63 along any acceleration curve, and control curves 59 and 63 thus may be readily plotted graphically.

Figure 5:
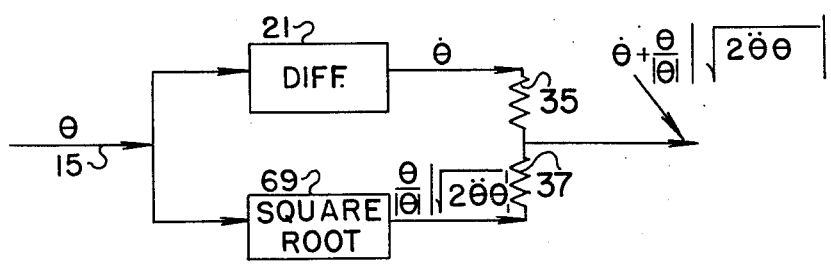
Figure 5 is a modification of the Figure 2 control signal circuit.

A number of modifications of the above described embodiment may be made. It will be noted that the Figure 2 derivation circuit produces a control signal of zero value when the displacement term $2|\ddot{\theta}|\theta$ and velocity term $|\dot{\theta}|\dot{\theta}$ are equal in magnitude as expressed by the equation $$2\ddot{\theta}\theta = \dot{\theta}^2$$

and of opposite sign or polarity, their signs corresponding to the sense of displacement and to the sense of the time-rate of displacement, respectively. Any derivation circuit which yields a zero control-signal when displacement $\theta$ and velocity $\dot{\theta}$ satisfy these conditions will serve to control the servo system operation in exactly the same manner as described with reference to the Figure 4 graph. An example of such a modified derivation circuit which secures the same end results is illustrated in Figure 5, in which conventional components are arranged to provide a control signal corresponding to the summation of a displacement term $\sqrt{2\ddot{\theta}\theta}$ and a velocity term $\dot{\theta}$. Displacement signal $\theta$ is here applied to a differentiator 21, producing a signal proportional to the velocity term $\dot{\theta}$ and having a polarity corresponding to the sense of displacement rate. Signal $\theta$ is also applied to a circuit 69 designed to amplify or multiply term $\theta$ by the factor $2|\ddot{\theta}|$ and to extract the square root of the product, the resultant output being here expressed as $$\frac{\theta}{|\theta|}\left|\sqrt{2\ddot{\theta}\theta}\right|$$

to indicate its having a polarity corresponding to the sign or sense of displacement $\theta$. Signals $\dot{\theta}$ and $$\frac{\theta}{|\theta|}\left|\sqrt{2\ddot{\theta}\theta}\right|$$

are applied to the summation circuit comprising resistors 35 and 37, and the resultant control signal developed by this derivation circuit is thus proportional to the expression $$\dot{\theta} + \frac{\theta}{|\theta|}\left|\sqrt{2\ddot{\theta}\theta}\right|$$

For a zero control-signal, then, the velocity and displacement term signals satisfy the same equation $$\dot{\theta}^2 = 2\ddot{\theta}\theta$$

which applies to the first described derivation circuit 17 shown in Figure 2. It is apparent that the control signal delivered by the modified derivation circuit of Figure 5 goes through positive, zero and negative values for the same conditions of displacement $\theta$ and velocity $\dot{\theta}$ as in the Figure 2 derivation circuit, and the servo system operation is thus controlled in the same manner as described with reference to the Figure 4 diagram.

Figure 6:
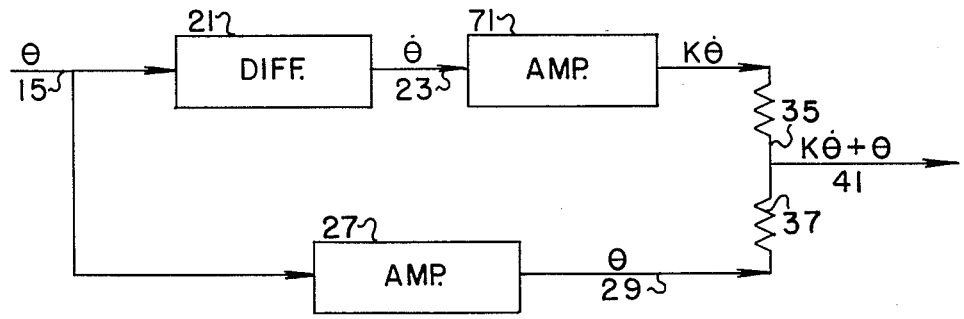
Figure 6 is a schematic diagram of another control signal circuit applicable to the system of Figure 1.
Figure 7:
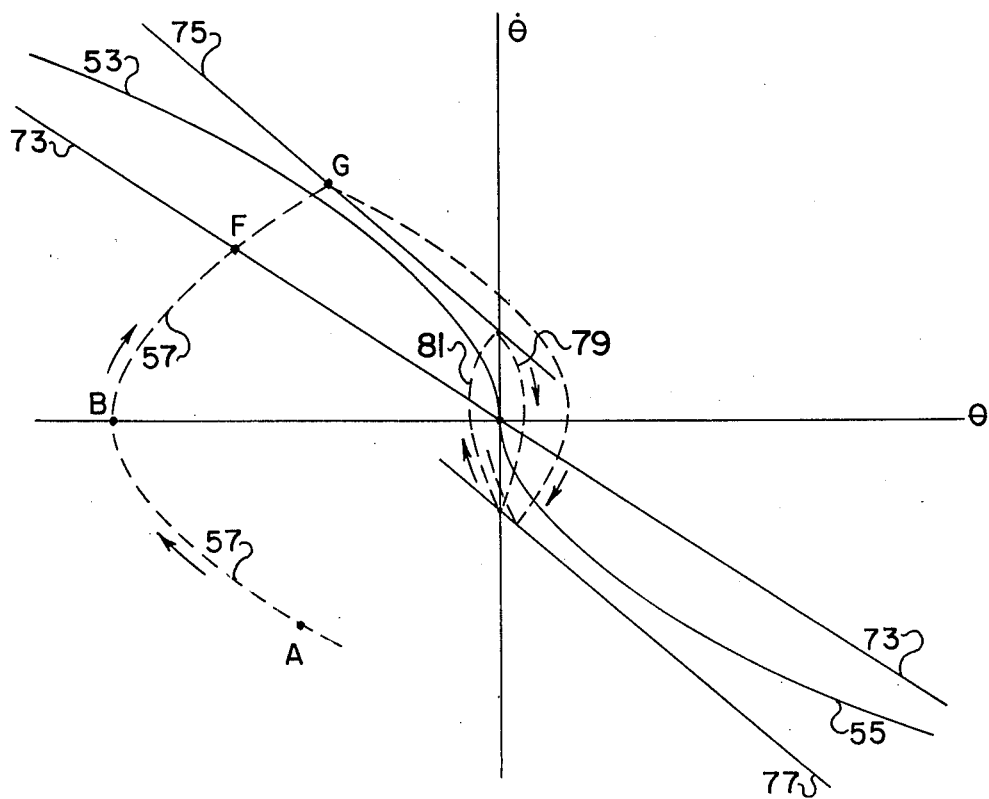
Figure 7 is a graph illustrating system load movements effected by the Figure 6 control signal circuit.

In another embodiment of the subject invention, the derivation circuit 17 is arranged to produce a modified control signal which reduces the adverse effect of delay time inherent in the system components, approaching more closely the theoretically perfect operation in which the system load is returned to zero displacement along the deceleration curve 53 as previously mentioned with reference to Figure 4. The derivation circuit of this embodiment is illustrated in Figure 6, again utilizing conventional components which perform the indicated operations. The derivation circuit is here somewhat similar to that shown in Figure 2, except that squaring circuit 25 of Figure 2 is replaced by an amplifier 71, and the gains of amplifiers 71 and 27 are so adjusted that their output signals are proportional to $K\dot{\theta}$ and $\ddot{\theta}$, respectively, where K is a constant having an optimum value as later described. The resultant control signal is given by the expression $K\dot{\theta}+\ddot{\theta}$. The detailed operation of this embodiment is quite similar to that already outlined for the derivation circuit of Figure 2. The operation diagram is shown in Figure 7, plotted to the same scale as in Figure 4, and for the same acceleration constant and inherent delay time. Deceleration curves 53 and 55 of Figure 4, defined by the expression $|\dot{\theta}|\dot{\theta}+2|\ddot{\theta}|\theta$, are here again shown for reference purposes, and line 73 defined by the equation $$K\dot{\theta}+\theta=0$$

is the zero control-signal curve in this embodiment. Control-lines 75 and 77 are the loci of points at which torque reversals actually take place, corresponding to control lines 59 and 63 in Figure 4. Assuming an initial condition A as before, the load decelerates along curve 57 to the point B at which the velocity is zero, then accelerates to the point F at which zero control-signal line 73 is reached. The motor torque is reversed at a time later by the amount T, at displacement and velocity conditions indicated by intersection point G of acceleration curve 57 and control line 75. The continuing action drives the system load to the condition of stable oscillation indicated by the closed loop 79, 81, in this instance of smaller amplitude than in Figure 4. The amplitude of the oscillation loop is dependent upon the slope of control-signal line 73, becoming smaller as the slope is made less by increasing K. An optimum value of K may in practice be obtained by increasing the gain of amplifier 71 relative to amplifier 27 to a point where oscillation loop 79, 81 is suitably small without severe reduction of the restoring torque.

Referring now to Figs. 8 through 10, there are shown circuit diagrams of a squaring circuit, a square-rooting circuit, and a differentiating circuit, respectively, which may be utilized in the system of the present invention. It is to be understood, of course, that these circuits are merely illustrative of suitable forms of the components, and that other circuits may be used without departing from the spirit and scope of the present invention.

In Fig. 8, there is shown a push-pull squaring circuit which is essentially the same as that illustrated in Figs. 19–22 on page 685, vol. 19 of the M. I. T. Radiation Laboratory Series entitled "Waveforms," and published in 1948 by the McGraw-Hill Book Company. In this circuit, tubes 81 and 82 constitute push-pull squaring circuits, and tubes 83 and 84 constitute a push-pull amplifier for supplying the input to squaring tubes 81 and 82. Tube 85 serves as a very high impedance common cathode load for tubes 83 and 84. The output of this circuit is proportional to the square voltage of the input voltage.

In Fig. 9, there is illustrated a square-rooting circuit which is essentially the same as that disclosed in Figs. 19–27 on page 689 of the above-cited text. In this circuit, tube 91 is a cathode follower having its grid bias established by resistor 92, diode 93, insuring that the effective bias is independent of input waveform. Tube 94 constitutes a quadratic element whose screen voltage-plate current chaarcteristic is approximately expressed by a quadratic equation.

Tube 95 operates as a cathode follower for supplying grid bias to tube 94, and affords a low impedance output circuit. Tube 96 serves as an adder, and resistor 97 operates to attenuate the voltage supplied to tube 94. In the circuit of Fig. 9, the output voltage is proportional to the square root of the input voltage.

Referring now to Fig. 10, there is illustrated a differentiating circuit which is substantially the same as that shown in Figs. 4–14 on page 73 of vol. 21 of the M. I. T. Radiation Laboratory Series entitled "Electronic Instruments," and published in 1948 by the McGraw-Hill Book Company. In this circuit, inductor 101 and resistor 102 form the differentiating elements, the output voltage, appearing on the plate 103 of tube 104, being proportional to the first derivative with respect to time of the input voltage applied to grid 105 of tube 104.

It is apparent that many embodiments employing the principles of the present invention may be devised, utilizing conventional components and circuitry giving end results which are equivalent to those achieved in the embodiments above described. For example, the displacement or deviation may be obtained in the form of an A.-C. signal having a phase characteristic related to the deviation $\theta$. This signal may be suitably amplified, then converted to a D.-C. signal θ by a phase comparator. Differentiation may be accomplished by use of an RC circuit, and amplifiers, wherever necessary, may be of either D.-C. or A.-C. signal type suitably designed for the purpose. Similarly, many conventional types of servomotor and reversing controls therefor are available, and may be utilized in practice of the present invention. Thus, many changes and many apparently widely different embodiments of the present invention could be made without departing from its true scope. It is therefore intended that all matter contained in the preceding description or shown in the accompanying drawings shall be interpreted as illustrative and not in a limiting sense.

I claim as my invention:

1. A servo system for correcting the displacement of a load from a predetermined position, said system comprising: a reversible motor for driving the load; selectively actuable means for fully energizing said motor in either direction to return the load to the predetermined position; first means responsive to displacement of the load for continuously producing a first electrical signal corresponding to the load displacement; a square root circuit coupled to said first means and responsive to said first signal for continuously producing a second electrical signal whose polarity corresponds to the direction of the displacement and whose magnitude is represented by the term $$\sqrt{2\theta|\ddot{\theta}|}$$

where θ represents the load displacement and $\ddot{\theta}$ represents the load acceleration and deceleration; a differentiating circuit coupled to said first means and responsive to said first signal for continuously producing a third electrical signal whose magnitude and polarity are represented by the term $\dot{\theta}$, where $\dot{\theta}$ represents the time rate of change of the load displacement; and means coupled to said square root circuit and to said differentiating means and responsive to the algebraic sense of the summation of said second and third signals for selectively actuating said selectively actuable means to energize said motor in a restoring direction.

2. A servo system for rapidly returning a displaced load toward a point of zero displacement and zero velocity, said system comprising: a reversible motor for driving the load, said motor being fully energizable in either direction and having a substantially constant acceleration and deceleration characteristic over the range of load displacement; selectively actuable means for fully energizing said motor in either direction; and a control circuit for selectively actuating said selectively actuable means to fully energize said motor to drive said load toward a point whereat full energization of the motor in the opposite direction would return the load to the point of zero displacement and zero velocity, said control signal circuit comprising first means including a square root circuit for generating an electrical signal proportional to $$\frac{\theta}{|\theta|}\left|\sqrt{2\ddot{\theta}\theta}\right|$$

where θ represents the instantaneous load displacement and $\ddot{\theta}$ represents the magnitude of the substantially constant acceleration and deceleration characteristic of said motor, second means including a differentiator responsive to the displacement of the load for continuously generating a second electrical signal proportional to the time rate of change of the load displacement, summation means for combining said first and second signals to produce an output signal having a polarity corresponding to the algebraic sense of the summation of said first and second signals, and means for applying said output signal to said selectively actuable means for reversing the energization of said motor when said output signal changes polarity.

3. A system for correcting the displacement of a load from a predetermined position, said system comprising: a reversible motor for driving the load, said motor being substantially uniformly acceleratable and deceleratable over the range of load displacement; selectively actuable means for fully energizing said motor in either direction to return the load toward the predetermined position; and control means continuously responsive to the displacement of the load and to the time rate of change of the displacement for selectively actuating said selectively actuable means, said control means including a square root circuit for developing a first electrical signal whose polarity corresponds to the direction of the displacement and whose magnitude is proportional to the term $$\sqrt{2\theta|\ddot{\theta}|}$$

where θ represents the instantaneous load displacement and $\ddot{\theta}$ represents the absolute magnitude of the load acceleration and deceleration, a differentiating circuit for producing a second electrical signal whose magnitude and polarity are represented by the term $\dot{\theta}$, where $\dot{\theta}$ represents the time rate of change of the displacement, a summation network having first and second input terminals coupled to said square root circuit and said differentiating circuit, respectively, said summation network being responsive to said first and second signals for producing an electrical output signal whose polarity changes each time the load is driven past a point whereat instantaneous reversal of the motor would drive the load to the predetermined position, and means for applying said output signal to said selectively actuable means, said selectively actuable means being responsive to said output signal for fully energizing said motor in one direction when said output signal is of one polarity, and for fully energizing said motor in the opposite direction when said output signal is of the other polarity.

References Cited in the file of this patent

UNITED STATES PATENTS

| Number | Name | Date |
|---|---|---|
| 2,105,598 | Hubbard | Jan. 18, 1938 |
| 2,175,985 | Callender et al. | Oct. 10, 1939 |
| 2,414,430 | Nisbet | Jan. 14, 1947 |
| 2,460,276 | Bernas | Feb. 1, 1949 |
| 2,475,217 | Bernas | July 5, 1949 |
| 2,499,222 | Hofstadter | Feb. 28, 1950 |
| 2,505,258 | Robinette | Apr. 25, 1950 |
| 2,534,801 | Siltamaki | Dec. 19, 1950 |